United States Patent [19]

Reynolds

[11] Patent Number: 5,743,081
[45] Date of Patent: Apr. 28, 1998

[54] GAS TURBINE ENGINE

[75] Inventor: Graham A. Reynolds, Coventry, England

[73] Assignee: Rolls-Royce plc, London, England

[21] Appl. No.: 419,390

[22] Filed: Apr. 10, 1995

[30] Foreign Application Priority Data

Apr. 16, 1994 [GB] United Kingdom ............ 9407588

[51] Int. Cl.$^6$ .................................................. F02C 3/14
[52] U.S. Cl. .................................................. 60/39.17
[58] Field of Search ........................... 60/39.04, 39.17

[56] References Cited

U.S. PATENT DOCUMENTS

| 910,237 | 1/1909 | Schmick | 60/39.04 |
|---|---|---|---|
| 2,257,982 | 10/1941 | Seippel | 60/39.17 |
| 2,312,995 | 3/1943 | Anxionnaz et al. | 60/39.17 |
| 2,511,385 | 6/1950 | Udale | 60/39.04 |
| 2,621,475 | 12/1952 | Loy | 60/39.17 |
| 3,751,909 | 8/1973 | Kohler | 60/39.17 |

FOREIGN PATENT DOCUMENTS

| 950613 | 10/1956 | Germany | 60/39.17 |
|---|---|---|---|
| 1560749 | 4/1990 | U.S.S.R. | 60/39.17 |
| 985907 | 3/1965 | United Kingdom . | |
| 1233718 | 5/1971 | United Kingdom . | |
| 1362799 | 8/1974 | United Kingdom . | |
| 2229733 | 10/1990 | United Kingdom . | |
| 90 01624 | 2/1990 | WIPO . | |

*Primary Examiner*—Michael Koczo
*Attorney, Agent, or Firm*—Cushman, Darby Cushman, IP Group of Pillsbury Madison & Sutro LLP

[57] ABSTRACT

A gas turbine engine is provided with a plurality of compressors and a plurality of turbines. The compressors supply less than half of the oxygen received to the combustor chamber and thus fuel rich combustion occurs in the combustion means. A number of combustion ducts are positioned between adjacent turbines and oxygen is supplied to each of the combustion ducts from the respective compressor via the cooling passages of the respective turbine. Unburned fuel in the exhaust gases of the combustion means is mixed with cooling air in the turbines and is then burnt in the combustion ducts.

11 Claims, 2 Drawing Sheets

GAS TURBINE ENGINE

FIELD OF THE INVENTION

The present invention relates to gas turbine engines, and is applicable to industrial gas turbines, marine gas turbine engines, aero gas turbine engines and other gas turbine engines.

BACKGROUND OF THE INVENTION

It is known in the prior art to provide a gas turbine engine with a plurality of compressors arranged in flow series and to arrange combustion chambers to receive compressed air from the last compressor in the series. A plurality of turbines are arranged in flow series to sequentially receive the exhaust gases from the combustion chambers, and each of the turbines is arranged to drive a respective one of the compressors. In some gas turbine engines a power turbine is arranged to receive the exhaust gases from the last turbine in the series and to provide useful output power.

In the known gas turbine engine the compressors supply sufficient oxygen to burn all the fuel supplied to the combustion chambers in the combustion chambers.

The present invention seeks to provide a novel gas turbine engine.

SUMMARY OF THE INVENTION

Accordingly the present invention provides a gas turbine engine comprising at least one compressor, combustion means arranged to receive an oxygen containing gas from the at least one compressor, means to supply fuel to the combustion means, a plurality of turbines arranged in flow series to sequentially receive the exhaust gases from the combustion means, at least one of the turbines is arranged to drive the at least one compressor, the at least one compressor is arranged to supply super-stoichiometric amounts of oxygen containing gas to the combustion means such that rich combustion occurs and unburned fuel exits from the combustion means with the exhaust gases, combustion duct means positioned between at least two adjacent ones of the plurality of turbines, means to supply a portion of oxygen containing gas from the at least one compressor to the combustion duct means to allow the combustion of at least some of the unburned fuel in the exhaust gases in the combustion duct means.

Preferably the gas turbine comprises a plurality of compressors arranged in flow series, combustion means arranged to receive an oxygen containing gas from the last compressor in the series, a plurality of turbines arranged in flow series to sequentially receive the exhaust gases from the combustion means, each of the compressors is arranged to be driven by a respective one of the turbines.

Preferably there are a plurality of combustion duct means, each compressor is arranged to supply a portion of oxygen containing gas to a respective one of the combustion duct means to allow the combustion of unburned fuel in the exhaust gases in the respective combustion duct means.

Preferably the means to supply a portion of oxygen containing gas from at least one of the compressors to the combustion duct means supplies the oxygen containing gas firstly to the respective turbine to cool the turbine, the oxygen containing gas subsequently flowing into the respective combustion duct means.

Preferably the means to supply a portion of oxygen containing gas from at least one of the compressors to the combustion duct means supplies the oxygen containing gas to the turbine blades of the turbine.

Preferably the means to supply a portion of oxygen containing gas from at least one of the compressors to the combustion duct means supplies the oxygen containing gas to film cool the turbine blades.

Preferably at least one intercooler means is arranged to cool the oxygen containing gas supplied from the at least one compressor to an adjacent downstream compressor.

Preferably the intercooler means is arranged to cool the portion of oxygen containing gas supplied to the at least one combustion duct means.

Preferably the oxygen containing gas is air.

Preferably one of the turbines is a power turbine.

The turbines may be single stage turbines or two stage turbines.

The present invention also provides a method of operating a gas turbine engine, the gas turbine engine comprising a plurality of compressors arranged in flow series, combustion means and a plurality of turbines arranged in flow series to sequentially receive the exhaust gases from the combustion means, each compressor is arranged to be driven by a respective one of the turbines, combustion duct means positioned between at least two adjacent ones of the plurality of turbines, the method comprising:

(a) supplying fuel into the combustion means, (b) supplying a super-stoichiometric amount of the oxygen entering the gas turbine engine to the combustion means such that there is insufficient oxygen to burn all the fuel, (c) burning the fuel in the oxygen at rich fuel/air ratios such that unburned fuel exits from the combustion means with the exhaust gases, (d) supplying oxygen from one of the compressors to the combustion duct means, (e) burning at least some of the unburned fuel in the exhaust gases in the combustion duct means.

Preferably the gas turbine engine has a plurality of combustion ducts, each of the combustion ducts is positioned between a respective pair of adjacent turbines, the method comprising supplying oxygen from each of the compressors to a respective combustion duct.

Preferably supplying less than half of the oxygen entering the gas turbine engine to the combustion means.

BRIEF DESCRIPTION OF THE DRAWINGS

The present invention will be more fully described by way of example with reference to the accompanying drawings, in which.

DETAILED DESCRIPTION OF THE INVENTION

Figure 1:
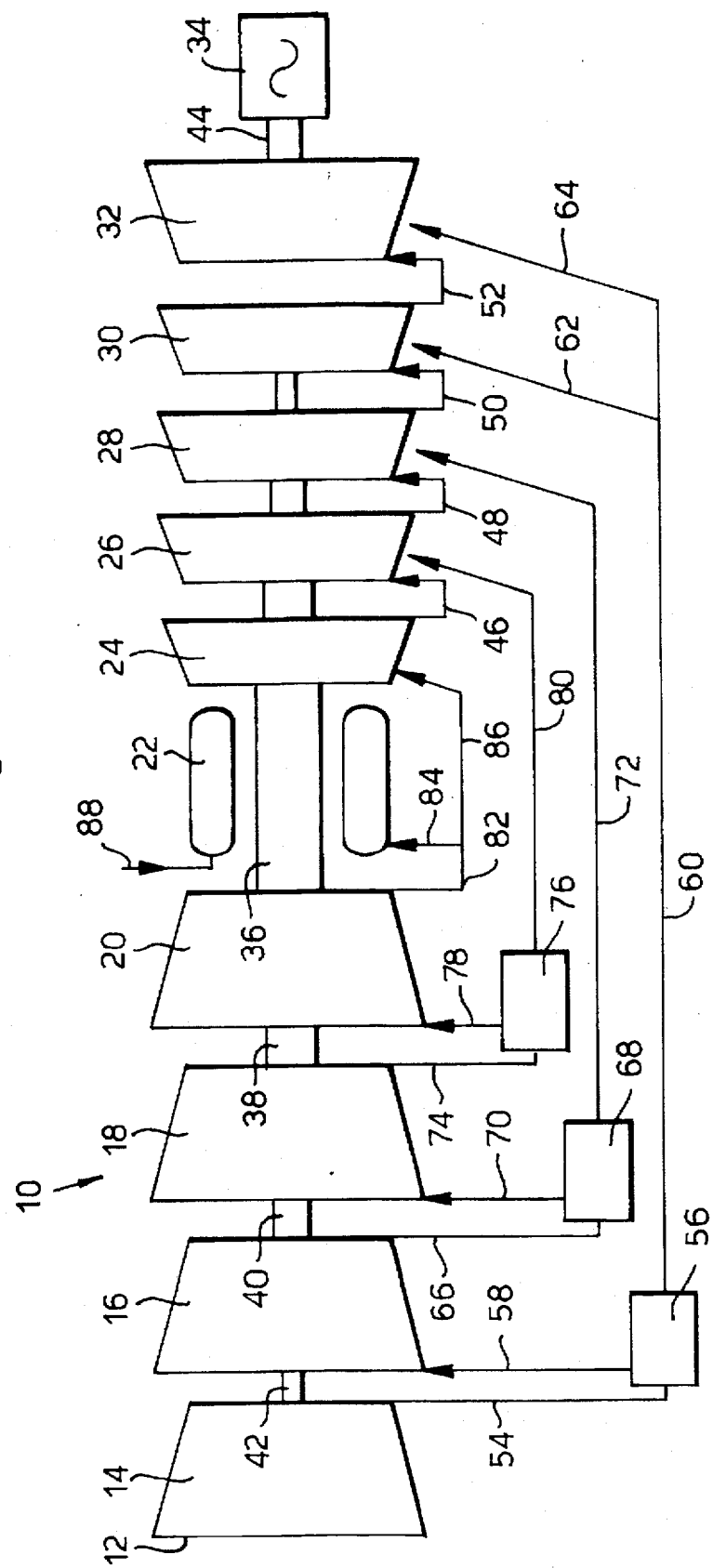
FIG. 1 is a diagrammatic view of a gas turbine engine according to the present invention.

A gas turbine engine 10 comprises in axial flow series an intake 12, a first compressor 14, a second compressor 16, a third compressor 18, a fourth compressor 20, combustion means 22, a first turbine 24, a second turbine 26, a third turbine 28, a fourth turbine 30 and a power turbine 32. The first turbine 24 is arranged to drive the fourth compressor 20 via shaft 36, the second turbine 26 is arranged to drive the third compressor 18 via shaft 38, the third turbine 28 is arranged to drive the second turbine 16 via shaft 40 and the fourth turbine 30 is arranged to drive the first compressor 14 via shaft 42. The power turbine 32 is arranged to drive a generator 34 via a shaft 44.

The combustion means 22 is supplied with fuel by a number of fuel burners 88 which inject all the fuel for combustion. The combustion means 22 in this example comprises a annular combustion chamber. However, it may be possible to use a plurality of combustion chambers arranged in an annular arrangement, or it may be possible to use a plurality of combustion chambers arranged radially.

A plurality of combustion ducts 46, 48, 50 and 52 are provided, each of the combustion ducts 46, 48, 50 and 52 is positioned axially between two adjacent turbines. The combustion duct 46 is positioned between the first and second turbines 24 and 26. The combustion duct 48 is positioned between the second and third turbines 26 and 28. The combustion duct 50 is positioned between the third and fourth turbines 28 and 30 and the combustion duct 52 is positioned between the fourth turbine 30 and the power turbine 32.

A duct 54 supplies compressed air leaving the first compressor 14 to a first intercooler 56. The cooled compressed air is divided and one portion of compressed air is supplied through duct 58 to the second compressor 16, and the other portion of compressed air is supplied through ducts 60 and 62 to the fourth turbine 30 and through ducts 60 and 64 to the power turbine 32.

A duct 66 supplies compressed air leaving the second compressor 16 to a second intercooler 68. The cooled compressed air is divided and one portion of compressed air is supplied through duct 70 to the third compressor 18, and the other portion of compressed air is supplied through duct 72 to the third turbine 28.

A duct 74 supplies compressed air leaving the third compressor 18 to a third intercooler 76. The cooled compressed air is divided and one portion of compressed air is supplied through duct 78 to the fourth compressor 20, and the other portion of compressed air is supplied through duct 80 to the second turbine 26.

The compressed air leaving the fourth compressor 20 is divided and one portion of compressed air is supplied through duct 84 to the combustion means 22, and the other portion of compressed air is supplied through duct 86 to the first turbine 24.

In operation all the fuel is supplied into the combustion chamber 22, but the fourth compressor 20 is arranged to deliver insufficient, or super-stoichiometric, quantities of oxygen to the combustion chamber 22 such that the fuel/air ratio is rich in the combustion chamber 22, such that all the fuel is not burned in the combustion chamber 22. This is known as super-stoichiometric combustion. The combustion chamber 22 exhaust gases do not contain surplus oxygen, but contain unburned fuel. The temperature of the exhaust gases is below the maximum temperature expected from stoichiometry. Less than half of the air entering the compressor 14 is supplied to the combustor chamber 22.

Figure 2:
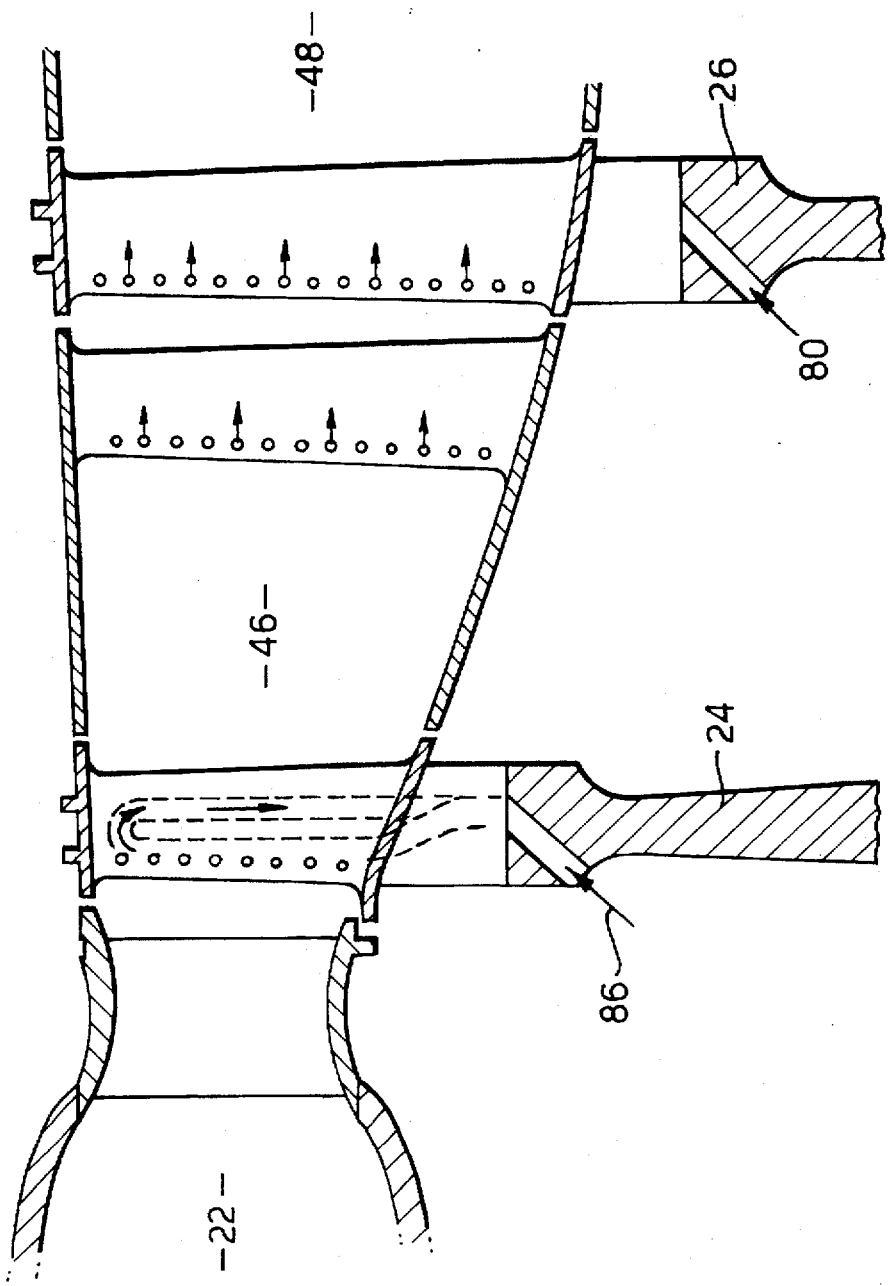
FIG. 2 is an enlarged view of a portion of the gas turbine engine shown in FIG. 1.

The exhaust gases leave the combustion chamber 22 and flow through the first turbine 24. The first turbine 24 is cooled by the cooling air supplied from the fourth compressor 20. The cooling air is used to internally cool and externally film cool the turbine blades and turbine vanes of the first turbine 24 as shown in FIG. 2. The cooling air is then discharged into the exhaust gases of the combustion chamber flowing through the first turbine 24. The cooling air mixes in with the exhaust gases and is carried by the exhaust gases into the combustion duct 46. The cooling air allows more of the fuel in the exhaust gases to be burnt in the combustion duct 46. The fuel does not burn in the oxygen until the fuel and oxygen is downstream of the turbine blades of the first turbine 24 due to auto ignition delay. The combustion in the combustion duct 46 produces a temperature rise approximately equal to the temperature drop across the first turbine 24.

The exhaust gases leave the combustion duct 46 and flow through the second turbine 26. The second turbine 26 is cooled by the cooling air supplied from the third compressor 18. The cooling air is used to internally cool and externally film cool the turbine blades and turbine vanes of the second turbine 26. The cooling air is then discharged into the exhaust gases of the combustion means flowing through the second turbine 26. The cooling air mixes in with the exhaust gases and is carried by the exhaust gases into the combustion duct 48. The cooling air allows more of the fuel in the exhaust gases to be burnt in the combustion duct 48. The fuel does not burn in the oxygen until the fuel and oxygen is downstream of the turbine blades of the second turbine 26 due to auto ignition delay. The combustion in the combustion duct 48 produces a temperature rise approximately equal to the temperature drop across the second turbine 26.

The exhaust gases leave the combustion duct 48 and flow through the third turbine 28. The third turbine 28 is cooled by the cooling air supplied from the second compressor 16. The cooling air is used to internally cool and externally film cool the turbine blades and turbine vanes of the third turbine 28. The cooling air is then discharged into the exhaust gases of the combustion means flowing through the third turbine 28. The cooling air mixes in with the exhaust gases and is carried by the exhaust gases into the combustion duct 50. The cooling air allows more of the fuel in the exhaust gases to be burnt in the combustion duct 50. The fuel does not burn in the oxygen until the fuel and oxygen is downstream of the turbine blades of the third turbine 28 due to auto ignition delay. The combustion in the combustion duct 50 produces a temperature rise approximately equal to the temperature drop across the third turbine 28.

The exhaust gases leave the combustion duct 50 and flow through the fourth turbine 30. The fourth turbine 30 is cooled by the cooling air supplied from the first compressor 14. The cooling air is used to internally cool and externally film cool the turbine blades and turbine vanes of the fourth turbine 30. The cooling air is then discharged into the exhaust gases of the combustion means flowing through the fourth turbine 30. The cooling air mixes in with the exhaust gases and is carried by the exhaust gases into the combustion duct 52. The cooling air allows more of the fuel in the exhaust gases to be burnt in the combustion duct 52. The fuel does not burn in the oxygen until the fuel and oxygen is downstream of the turbine blades of the fourth turbine 30 due to auto ignition delay. The combustion in the combustion duct 52 produces a temperature rise approximately equal to the temperature drop across the fourth turbine 30.

The exhaust gases leave the combustion duct 52 and flow through the power turbine 32. The power turbine 32 is cooled by the cooling air supplied from the first compressor 14. The cooling air is used to internally cool and externally film cool the turbine blades and turbine vanes of the power turbine 30. The cooling air is then discharged into the exhaust gases of the combustion means flowing through the power turbine 32.

The temperature of the exhaust gases at this point is quite high, approximately 1600 to 1700° K. These high temperature exhaust gases are useful for producing steam in a combined cycle system.

In the design of the gas turbine engine it must be arranged for the length of each turbine to be such that the auto ignition delay time is greater than the time taken for the exhaust gases to flow through that turbine. Due to the fact that combustion occurs immediately downstream of a turbine it may be necessary to have single stage turbines to drive each compressor. For example in industrial gas turbine engines with large chord turbine blades, each turbine will comprise only a single stage of turbine blades. In this case for a high pressure ratio cycle gas turbine engine it is necessary to have a large number of compressor spools each with their own single stage turbine. However, in the case of aero gas turbines with small chord turbine blades, each turbine may have two stages of turbine blades. It may be that some of the turbines will be single stage turbines and some of the turbines will be two stage turbines.

The gas turbine engine is made to achieve full load by first burning lean in the combustion chamber in the conventional manner. Then by injecting sufficient quantities of water the combustion chamber is made to burn stoichiometrically. Finally the fuel flow is gradually increased, whilst reducing water consumption gradually to zero, to make the combustion chamber burn rich.

This gas turbine engine cycle has a number of advantages. The cycle approaches the Ericcson Cycle at the expansion part, but with the intercooling approximates more closely still. This may be a more efficient cycle than the Brayton cycle. The environment in the combustion chamber and the turbines of the gas turbine engine is a reducing one, and therefore oxidation of the components is reduced or prevented. The emissions of the gas turbine engine are very low. The oxides of nitrogen (NOx) are unlikely to be formed due to the lack of oxygen in the combustion means. Carbon monoxide is likely to be burnt out as temperatures are kept high, above 1600° K. The turbines act as good mixers of the unburned fuel and the cooling air and ensure that there are no local hot spots. The temperature of the exhaust gases of the gas turbine engine is high allowing the production of steam for combined cycle systems.

Although the description, and drawings, has referred to the use of intercoolers it may be possible to provide gas turbine engines without intercoolers. It may be possible to supply compressed air directly from the compressors to the combustion ducts between the turbines. It may be possible to use any number of turbines and compressors. The number of turbines and combustion ducts is preferably chosen such that all the unburned fuel in the exhaust gases from the combustion chamber is burned, the stoichiometric amount of oxygen is supplied to the fuel in the exhaust gases to give complete combustion.

The power turbine may be used to drive an output power shaft directly or via a gearbox to provide propulsive power rather than drive a generator. It may be possible to dispense with the power turbine in some applications.

The invention is particularly applicable to industrial and marine gas turbine engines, but it may be used for aero gas turbine engines and other propulsive gas turbine engines.

I claim:

1. A gas turbine engine comprising a plurality of compressors arranged in flow series, combustion means arranged to receive an oxygen containing gas from the last compressor in the series, means to supply fuel to the combustion means, a plurality of turbines arranged in flow series to sequentially receive the exhaust gases from the combustion means, each of the compressors being arranged to be driven by a respective one of the turbines, the last compressor in the series being arranged to supply super-stoichiometric amounts of oxygen containing gas to the combustion means such that rich combustion occurs and unburned fuel exits from the combustion means with the exhaust gases, a plurality of combustion duct means arranged in flow series, each combustion duct means being positioned between two adjacent ones of the plurality of turbines, each compressor being arranged to supply a portion of oxygen containing gas to a respective one of the combustion duct means to allow the combustion of at least some of the unburned fuel in the exhaust gases in the combustion duct means, at least one of the combustion duct means receiving super-stoichiometric amounts of oxygen containing gas such that rich combustion occurs, said means to supply a portion of oxygen containing gas from the compressors to the combustion duct means comprising ducts to supply the oxygen containing gas firstly to the respective turbine to cool the turbine, the oxygen containing gas subsequently flowing into the respective combustion duct means.

2. A gas turbine engine as claimed in claim 1 wherein the ducts to supply a portion of oxygen containing gas from the compressors to the combustion duct means supplies the oxygen containing gas to the turbine blades of the turbine.

3. A gas turbine engine as claimed in claim 2 wherein the duct to supply a portion of oxygen containing gas from the compressors to the combustion duct means supplies the oxygen containing gas to film cool the turbine blades.

4. A gas turbine engine as claimed in claim 1 comprising at least one intercooler arranged to cool the oxygen containing gas supplied from at least one of the compressors to an adjacent downstream compressor.

5. A gas turbine engine as claimed in claim 4 wherein the intercooler is arranged to cool the portion of oxygen containing gas supplied to the respective combustion duct means.

6. A gas turbine engine as claimed in claim 1 wherein the oxygen containing gas is air.

7. A gas turbine engine as claimed in claim 1 wherein at least one of the turbines is a single stage turbine.

8. A gas turbine engine as claimed in claim 7 wherein all of the turbines are single stage turbines.

9. A gas turbine engine as claimed in claim 1 wherein at least one of the turbines is a two stage turbine.

10. A gas turbine engine as claimed in claim 1, wherein the length of each turbine is such that an auto ignition delay time is provided which is greater than the time taken for the exhaust gases to flow through that turbine.

11. A gas turbine engine comprising a plurality of compressors arranged in flow series, combustion means arranged to receive an oxygen containing gas from the last compressor in the series, means to supply fuel to the combustion means, a plurality of turbines arranged in flow series to sequentially receive the exhaust gases from the combustion means, each of the compressors being arranged to be driven by a respective one of the turbines, the last compressor in the series being arranged to supply super-stoichiometric amounts of oxygen containing gas to the combustion means such that rich combustion occurs and unburned fuel exits from the combustion means with the exhaust gases, a plurality of combustion duct means arranged in flow series, each combustion duct means being positioned between two adjacent ones of the plurality of turbines, each compressor being arranged to supply a portion of oxygen containing gas to a respective one of the combustion duct means to allow the combustion of at least some of the unburned fuel in the exhaust gases in the combustion duct means, at least one of the combustion duct means receiving super-stoichiometric amounts of oxygen containing gas such that rich combustion occurs, at least one inter-cooler arranged to cool the oxygen containing gas supplied from at least one of the compressors to an adjacent downstream compressor, said inter-cooler being arranged to cool the portion of oxygen containing gas supplied to the respective combustion duct means.

* * * * *